(12) United States Patent
Nichols et al.

(10) Patent No.: US 11,457,517 B2
(45) Date of Patent: Sep. 27, 2022

(54) LIGHTING SYSTEM

(71) Applicant: AVID Labs, LLC, Fort Wayne, IN (US)

(72) Inventors: Joel A. Nichols, Columbia City, IN (US); Dominic Picciuto, Crestview Hills, KY (US)

( * ) Notice: Subject to any disclaimer, the term of this patent is extended or adjusted under 35 U.S.C. 154(b) by 0 days.

(21) Appl. No.: 17/076,738

(22) Filed: Oct. 21, 2020

(65) Prior Publication Data

US 2021/0120641 A1   Apr. 22, 2021

Related U.S. Application Data

(60) Provisional application No. 62/924,363, filed on Oct. 22, 2019.

(51) Int. Cl.

| H05B 45/10 | (2020.01) |
|---|---|
| F21S 41/13 | (2018.01) |
| B60Q 1/52 | (2006.01) |
| F21S 41/14 | (2018.01) |
| B60Q 1/46 | (2006.01) |
| F21S 41/141 | (2018.01) |

(52) U.S. Cl.
CPC ............... *H05B 45/10* (2020.01); *B60Q 1/46* (2013.01); *B60Q 1/52* (2013.01); *F21S 41/13* (2018.01); *F21S 41/141* (2018.01); *F21S 41/18* (2018.01)

(58) Field of Classification Search
CPC ......... H05B 45/00; H05B 45/10; F21S 41/13; F21S 41/141; F21S 41/18; B60Q 1/46; B60Q 1/52; F21V 23/0464; F21V 23/003; F21V 23/0428; F21V 23/00; F21V 17/12; F21L 4/027
See application file for complete search history.

(56) References Cited

U.S. PATENT DOCUMENTS

| 4,970,628 A | 11/1990 | Bergkvist |
|---|---|---|
| 5,255,163 A | 10/1993 | Neumann |
| 6,122,093 A | 9/2000 | Lynam |
| 10,076,993 B2 | 9/2018 | Nichols |
| 2004/0105264 A1 | 6/2004 | Spero |
| 2008/0218998 A1* | 9/2008 | Quest ..................... G01N 21/91 73/40 |
| 2019/0162381 A1* | 5/2019 | Estes ....................... F21S 41/18 |

OTHER PUBLICATIONS

Robe UV Strobe Data Sheet taken from https://www.robe.cz/uv-strobe/ (3 pages).

* cited by examiner

*Primary Examiner* — Jimmy T Vu

(57) ABSTRACT

A lighting system including a lighting device configured to be connected to an object. The lighting device includes a body, at least one visible light source connected to the body, and at least one ultraviolet light source connected to the body. The at least one ultraviolet light source is operably coupled to the at least one visible light source. The lighting device is configured for strobing the visible light and ultraviolet light sources by turning the at least one ultraviolet light source on upon the at least one visible light source turning off and turning the at least one ultraviolet light source off upon the at least one visible light source turning on such that a reflectance material of an object, which is not being illuminated by the at least one visible light source, is illuminated by the at least one ultraviolet light source.

20 Claims, 3 Drawing Sheets

LIGHTING SYSTEM

CROSS REFERENCE TO RELATED APPLICATIONS

This is a non-provisional application based upon U.S. provisional patent application Ser. No. 62/924,363, entitled "LIGHTING SYSTEM", filed Oct. 22, 2019, which is incorporated herein by reference.

BACKGROUND OF THE INVENTION

1. Field of the Invention

The invention relates to auxiliary safety lighting systems, and, more particularly, to a lighting system for emitting visible light and non-visible light.

2. Description of the Related Art

Traditionally, low-light conditions have presented a hazard to public safety personnel and the like. Thus, personal protective equipment, such as a safety vest, is often used to promote visibility. The introduction of LED lighting technology has reduced much of the ultraviolet (UV) radiation emitted from an artificial source to near zero. While the efficiency of the LED lighting is very desirable, the use thereof alters the spectral breadth of the light being produced. The lack of UV light degrades the effectiveness of safety markings placed on equipment, vehicles, and clothing worn by personnel, in that many of such markings are designed to fluoresce, which requires the presence of UV spectral power.

UV light is an electromagnetic radiation with a wavelength from roughly 10 nm (30 PHz) to 380 nm (750 THz), which is a shorter wavelength than that of visible light but longer than X-rays. UV radiation is present in sunlight, and also produced by electric arcs and specialized lights such as mercury-vapor lamps, tanning lamps, and black lights. Although the UV light lacks the energy to ionize atoms, long-wavelength ultraviolet radiation can influence chemical reactions, and causes many substances to glow or fluoresce. Therefore, known lighting systems may ineffectually illuminate equipment and personnel in low-light conditions.

What is needed in the art is a lighting system for providing the needed ultraviolet radiation in conjunction with light of the visible light spectrum, to improve the fluorescing of reflectors in low light conditions.

SUMMARY OF THE INVENTION

The invention provides a lighting system that includes a lighting device for emanating visible light and ultraviolet light. The lighting device may include a control device for strobing or flashing the visible light and the ultraviolet light on and off. When the visible light is off, the ultraviolet light is turned on in order to provide a secondary or additional light which radiates from a reflectance material of an object.

The invention in one form is directed to a lighting system including a lighting device configured to be connected to an object. The lighting device includes a body, at least one visible light source connected to the body, the at least one visible light source being configured for emitting visible light, and at least one ultraviolet light source connected to the body. The at least one ultraviolet light source is configured for emitting ultraviolet light. The at least one ultraviolet light source is operably coupled to the at least one visible light source. The lighting device is configured for strobing the at least one visible light source and the at least one ultraviolet light source by turning the at least one ultraviolet light source on upon the at least one visible light source turning off and turning the at least one ultraviolet light source off upon the at least one visible light source turning on such that a reflectance material of an object, which is not being illuminated by the at least one visible light source, is illuminated by the at least one ultraviolet light source.

The invention in another form is directed to a vehicle that includes a vehicle control unit and a lighting system. The lighting system includes a lighting device operably connected to the vehicle control unit. The lighting device includes a body, at least one visible light source connected to the body, the at least one visible light source being configured for emitting visible light, and at least one ultraviolet light source connected to the body. The at least one ultraviolet light source is configured for emitting ultraviolet light. The at least one ultraviolet light source is operably coupled to the at least one visible light source. The lighting device is configured for strobing the at least one visible light source and the at least one ultraviolet light source by turning the at least one ultraviolet light source on upon the at least one visible light source turning off and turning the at least one ultraviolet light source off upon the at least one visible light source turning on such that a reflectance material of an object, which is not being illuminated by the at least one visible light source, is illuminated by the at least one ultraviolet light source.

The invention in another form is directed to a lighting system. The lighting system includes a lighting device configured to be connected to an object. The lighting device includes a body and at least one ultraviolet light source connected to the body. The at least one ultraviolet light source is configured for emitting ultraviolet light. The lighting device is configured for cooperating with at least one existing visible light source. The lighting device is configured for turning on and turning off the at least one ultraviolet light source in cooperation with the at least one existing visible light source.

An advantage of the invention is that the lighting system dually emits UV light and visible light.

Another advantage of the invention is that the lighting system prolongs the life the UV light.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

As used herein, the term visible light refers to the spectrum of light which the human eye can see without the aid of some device. The term non-visible light refers to what the human eye cannot see without the aid of some device. The term ultraviolet (UV) light refers to electromagnetic radiation with a wavelength from roughly 10 nm (30 PHz) to 380 nm (750 THz).

Figure 1:
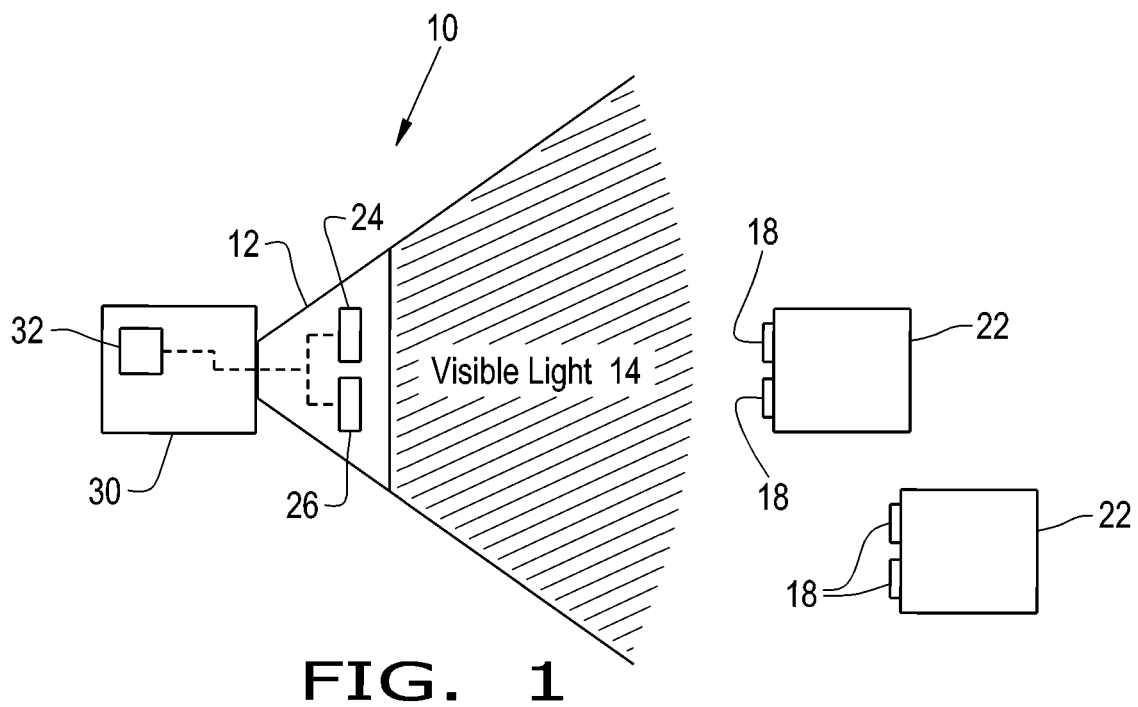
FIG. 1 is a schematic view of a lighting system according to an embodiment of the invention, wherein the lighting system is operating in a first strobing state for emanating visible light.
Figure 2:
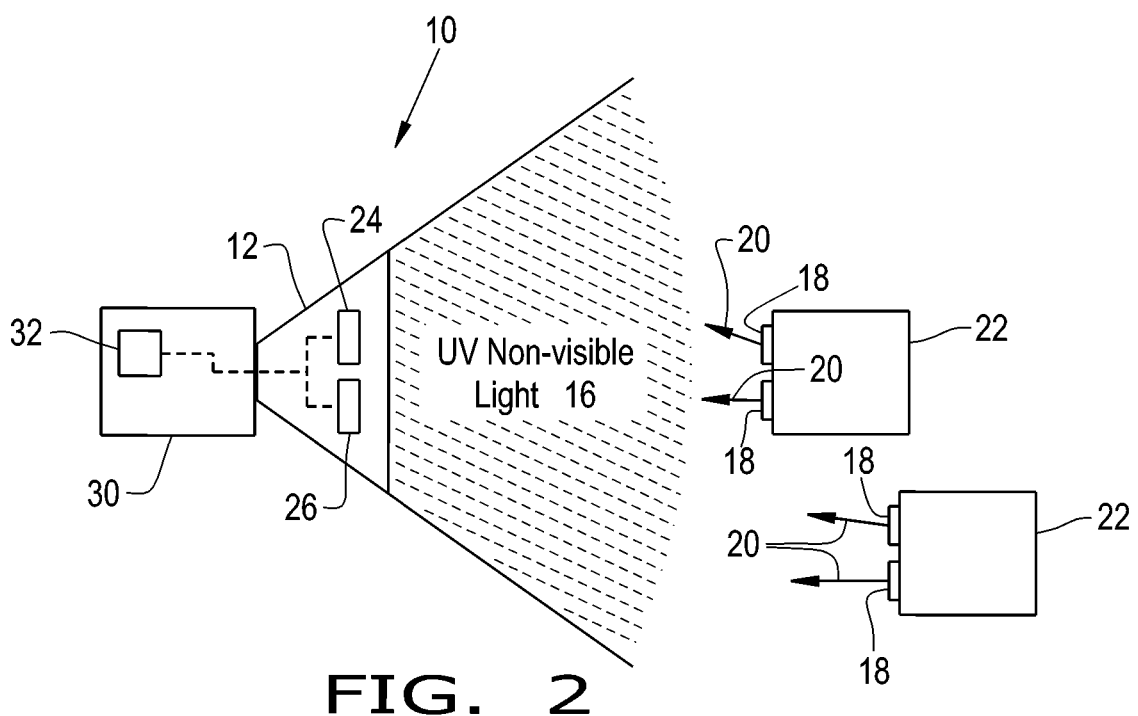
FIG. 2 is a schematic view of the lighting system of FIG. 1, wherein the lighting system is operating in a second strobing state for emanating ultraviolet light.

Referring now to the drawings, and more particularly to FIGS. 1-2, there is shown, in a schematic form, a lighting system 10. The lighting system 10 generally includes a lighting device 12 that emits visible light 14 and non-visible light 16. The non-visible light 16 may be in the form of ultraviolet (UV) light 16.

When UV light 16 illuminates and interacts with reflectance material(s) 18, the reflectance material(s) will 18 convert UV light 16 into visible light 20 to enhance the visibility of objects 22. A reflectance material 18 may include any desired material, paint, coating, fabric, etc., which phosphors, i.e., emits visible light upon absorbing UV radiation. An object 22 may include any object or thing, personnel, and/or animal, including, for example, a safety vest of an individual, markings on a roadway or barrier, and a vehicle.

The lighting system 10 may be connected to or used in conjunction with an object 30. For instance, the lighting system 10 may be movably or fixedly connected to the object 30. The object 30 may be in the form of a safety, service, or work vehicle. Alternatively, the object 30 may be in the form of a stationary object, such as a barrier or lighting fixture. As shown, the object 30 is in the form of a vehicle 30 which includes a vehicle control unit (VCU) 32. Therein, the lighting system 10 may help to illuminate the operator or supporting personnel of the vehicle 30.

The lighting device 12 may or may not be operably coupled to the VCU 32 of the vehicle 30. The operation of the lighting device 12 may be controlled by the VCU 32. Alternatively, the lighting device 12 may include its own analog and/or digital control device and accompanying circuitry for controlling the operation thereof independently or in conjunction with the VCU 32. The control device of the lighting device 12 may be in the form of a switch which toggles the on and off conditions of the visible and UV light 14, 16. The lighting device 12 may include its own power source, e.g. battery, and/or draw power from the vehicle 30 if it is coupled thereto.

The lighting device 12 may additionally include a body, e.g. housing, a light directing device, e.g. a lens, shield, reflector, or cone, at least one visible light source 24 for emitting visible light 14, and at least one UV light source 26 for emitting UV light 16. The lighting device 12 may be in the form of a light bar with numerous visible and UV light sources 24, 26. The lighting device 12 may comprise any desired material.

The light sources 24, 26 may be operably connected to one another. For example, the light sources 24, 26 may be wirelessly connected to one another or connected to one another via a designated electrical line. It should be appreciated that the light sources 24, 26 may be operably connected to one another by way of an independent connection to a control device and/or VCU 32 which controls the operation of the light sources 24, 26. The light sources 24, 26 may also be operably connected to the control device of the lighting device 12 and/or VCU 32. The light sources 24, 26 may be in the form of any desired visible lights 24 and UV lights 26, respectively. For example, the lights 24, 26 can in the form of light emitting diodes (LEDs). The LEDs may include a widened spectrum including UV light emitting sources and visual light emitting sources, for example, with a spectrum from 360 nm to 670 nm. The lights 24, 26 are connected to the body of the lighting device 12. The lights 24, 26 may be positioned within or on the body of the lighting device 12 at any desired location. The lights 24, 26 can be positioned on a common substrate or the same die. For example, the lights 24, 26 can be arranged in a multi-die LED chip configuration with a single UV emitter in the middle and surrounded with adjacent visible light emitters. The light emanating from the lights 24, 26 may be directed by the light directing device.

Lighting system 10 will light up or activate any reactive items 18 like safety vests during this off mode of visible light 14 such that any items 18 which are not presently illuminated by visible light 14 from the visible light 24 will be illuminated by the UV light 16 from the UV light 26.

The lighting system 10 may operate in multiple states. For example, the lighting system can operate in a single steady on state, a dual steady on state, and/or a strobing or flashing state. During the single steady on condition, the light 24 of the lighting device 12 acts as a solid (continuous) light in the desired visible spectrum chosen. During the dual steady on condition, both of the lights 24, 26 act as continuous lights for emanating visible and non-visible light. As soon as lighting device 12 is placed in a strobing or flashing state, during the "off" stage of visible light 14, UV light 16, outside of the visible range, is strobed "on" by the at least one UV light 26. Advantageously, this allows the introduction of a positive safety mode during a normal off stage of visible light 14. Additionally, advantageously, the energy of the system is conserved. Furthermore, the operational life of the UV light 26 is prolonged.

The UV light 26 may emanate UV light 16 in a wavelength range from 360 nm to 385 nm. For example, the UV light 16 can be emitted at a 365 nm wavelength. At the 365 nm wavelength, the lighting system 10 will not interfere with other lighting systems of other service vehicles or personnel. For instance, some service vehicles may include lighting systems that emit a blue light, and the UV light 26 will not interfere or be confused with such a wavelength of the lighting system.

Figure 3:
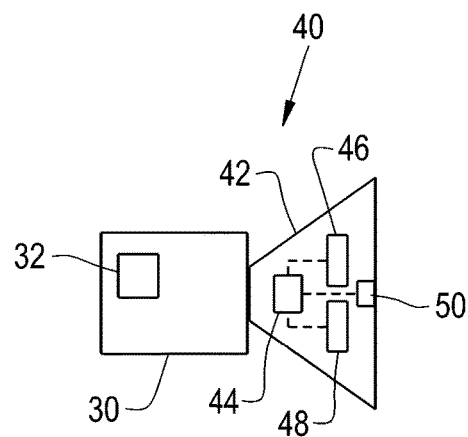
FIG. 3 is a schematic view of a lighting system according to another embodiment of the invention.

Referring now to FIG. 3, there is shown another embodiment of a lighting system 40. The lighting system 40 may be substantially similar to the lighting system 10 as described above, except that the lighting device 42 includes a control device 44 and at least one light sensor 50 in addition to the one or more visible and ultraviolet light sources 46, 48, i.e., lights 46, 48.

The control device 44 may be operably connected to the visible and ultraviolet lights 46, 48, the sensor(s) 50, and/or the VCU 32. The control device 44 may be located within the body of the lighting device 42. The control device 44 may be in the form of a switch, e.g. a relay switch, or a microcontroller. The control device 44 may be an analog and/or digital control device.

Each light sensor 50 may be operably connected to the control device 44. Each light sensor 50 may be in the form of an optical sensor for sensing ambient light around the object 30. For example, each light sensor 50 may sense ambient daylight and/or artificial light, e.g. street lights, lights of other service vehicles, etc. Each light sensor 50 may provide a light signal to the control device 44. For instance, each light sensor 50 may send a well-lit signal to the control device 44 upon sensing a sufficient amount of ambient light. As used herein, the term sufficient amount of ambient light may refer to a level of ambient light wherein the reflected light 20 from the UV radiation absorbed by the reflectance material(s) 18 is not brighter than the surrounding ambient light. In such a condition wherein there is sufficient ambient light, the control device 44 may continue to strobe the visible light 46 while maintaining the UV light 48 in an off state.

The control device 44 may be configured for selectively activating and/or directing UV light 48 at a particular area or location relative to the object 30 and/or all around the object 30. For example, the sensor(s) 50 may identify one or more areas or locations, adjacent to the object, which may have less ambient light than another surrounding area. Thereafter, the control device 44 may direct the UV light specifically to this particular, relatively low-lit area. Thus, the control device 44 may optimize the effectiveness of the UV light 48 by radiating specific areas which may subject the object 30 and/or personnel to a more dangerous situation relative to surrounding relatively more well-lit areas.

Figure 4:
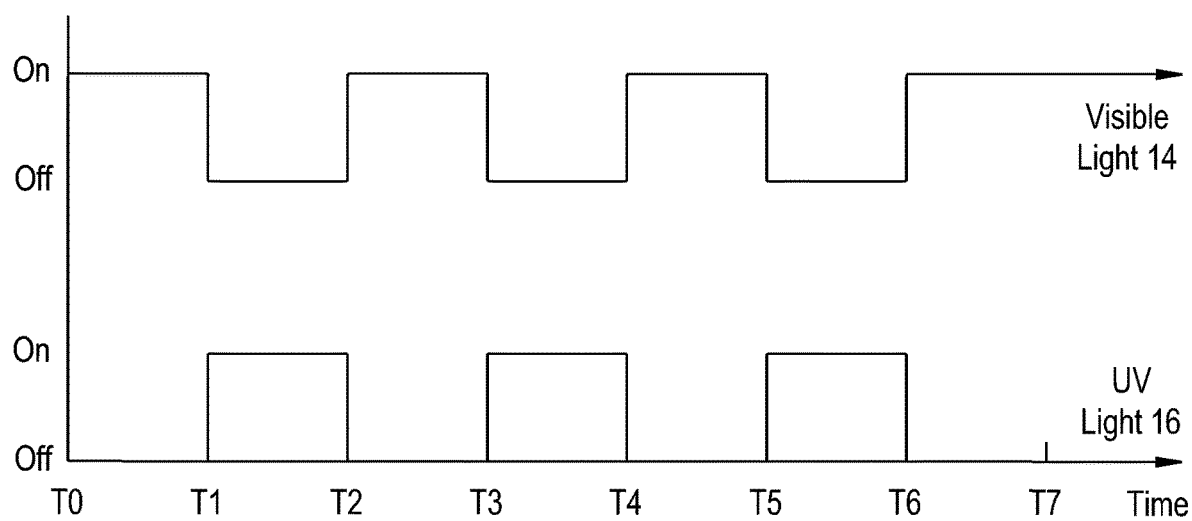
FIG. 4 is a diagram illustrating the timing of the first and second strobing states.

Now, additionally referring to FIG. 4, there is shown, in a schematical form, a simplified timing diagram of the lighting systems 10, 40. As can be seen when visible light 14 is on, UV light 16 is off. At time T0 lighting device 12 is emitting visible light 14. At times T1, T3, and T5 visible light 14 is turned off and UV light 16 is turned on. In a contra sense, at times T2, T4 and T6 UV light 16 is turned off and visible light 14 is turned on. The timing and durations of these events can vary such that UV light 16 may be on for only a portion of the time visible light 14 is off. Further, it is also contemplated that UV light 16 may strobe multiple times during an off time of the visible light 14.

At time T7 visible light 14 remains constantly on and UV light 16 remains off, as lighting device 12 transitions to an on state, by either automatic selection or by the selection of an operator of lighting system 10. While not illustrated, when an operator selects an off state, both lights 14 and 16 are off. It should be appreciated that an operator of the lighting system 10, 40 may control the operation of the lighting device 12, 42 and/or the control device 44 and/or VCU 32 may control the operation of the lighting device 12, 42.

Advantageously, the invention uses the off portion of a strobing visible light 14 to strobe UV light 16 on to enhance the visibility of the object 22. The invention can enhance the output of a lighting system in that the UV light 16 is only on during the time at which visible light 14 is off to thereby reduce power consumption rather than leaving a UV light on all of the time. Further, the light emitters, during the strobing phase (times T0-T6) are on only a portion of time, so that more light output may be possible during the on portions, with the light elements having a brief off, cooling state.

Figure 5:
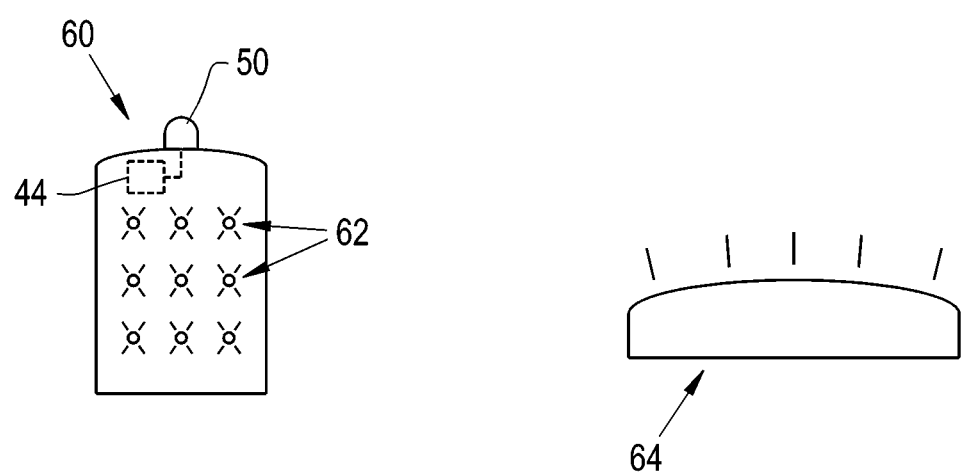
FIG. 5 is a schematic view of a lighting system according to another embodiment of the invention.

Referring now to FIG. 5, there is shown another embodiment of a lighting system 60. The lighting system 60 may include one or more visible and/or non-visible light source(s) 62, with one or more light sensors 50, that operate in tandem with one or more visible and/or non-visible light source(s) 64.

For instance, the lighting system 60 may be similar to the lighting system 10 or the lighting system 40, except that the lighting system 60 does not include a visible light source 24, 46. Hence, the lighting system 60 may be in the form of a stand-alone UV lighting system 60 which includes at least one non-visible light source 62 for emitting non-visible, e.g. UV, light.

The lighting system 60 may cooperate with one or more existing or additional visible light sources 64. The one or more existing visible light sources may be in the form of ambient light, visible lights on the vehicle 30, and/or visible lights on another object. Advantageously, the lighting system 60 may eliminate the need for rewiring the electronics of the vehicle 30 because the lighting system 60 may operate in tandem with one or more existing flashers or strobes on the vehicle 30. It should be appreciated that the visible light source(s) 64 may or may not be coupled to the UV light source(s) 62.

Whether by actively sensing visible light and/or passively awaiting a signal from visible light source(s) 64, the lighting system 60 may turn the UV light source(s) 62 on or off depending upon the existing light source(s) 64. For instance, the lighting system 60 may include a control device 44 and at least one light sensor 50, as discussed above. Thereby, the lighting system 60 may sense visible light via the light sensor 50. Then, the control device 44 may accordingly time the UV light source(s) 62 to turn on when the sensor 50 detects that the existing visible light 64 is turned off or when there is an insufficient amount of visible light. Additionally or alternatively, the lighting system 60 may turn the UV light source(s) 62 on or off upon receiving a signal from the existing visible light source 64, e.g. a strobe light. For instance, the existing visible light source 64 may emit a low-level electronic signal that tells the lighting system 60 when the visible light from the light source 64 is off or on. Hence, the visible light source 64 may electronically listen for the signal of the existing visible light source 64 and thereafter coordinate and time the firing of the UV light source(s) 62. Thereby, the UV light source 62 may be strobed in dependence upon the signal from the existing visible light source 64.

It should be appreciated that the lighting system 60 may be coupled to and powered by the vehicle 30. Additionally or alternatively, the lighting system 60 may be powered by its own power source, e.g. battery. It should also be appreciated that the that the lighting system 60 may also be configured for sensing or being signaled by an existing UV light source in order to alter the operation of the UV light source(s) 62. It should further be appreciated that the lighting system 60 may operate in a strobing state or a constant on state. In the strobing state, the UV light source 62 may be turned on and off in dependence upon an on or off state of the existing visible light source 64. In the constant on state, the UV light source 62 may remain on at all times unless an existing light source is sufficiently illuminating the surrounding area or object(s).

According to another aspect of the invention, the lighting system 60 may be configured as a monitoring system which utilizes one or more visible lights 62, with one or more light sensors 50, that operate in tandem with one or more "smart" and/or "dumb" UV lights 64. Thereby, the system 60 may include visible light source(s) 62, with one or more light sensors 50 attached thereto, and UV light(s) 64.

The monitoring system 60 may detect whether the surrounding area and/or objects are illuminated with light, and if not, the system may hit the area and/or objects with UV light. The monitoring system may time the UV light source(s) such that when other visible light and/or non-visible light strobes are off, it fires the UV light into a respective zone. For example, if a truck has four amber strobes and they all fire at the same time they are leaving a hole of blackness during the off phase. In the dark phase or blackness, the system may fire the area with UV light. The controller 44 and/or the amber strobes may include software, e.g. algorithms, which alters the strobe moment forward or backward in time towards dark times or blackness such that the strobes can fill the black moments. Hence, the strobes on a truck could independently but intelligently adjust their firing in real time. A person looking at the flashing vehicle may not be affected by the strobes being in sync and/or out of sync. Thus, persons working around the truck do not work in dark zones because the whole truck is lit 100% of the time and all therearound. If the UV and visible light timing is mixed, then the smart strobe could monitor the zone and adjust the visible strobe and fire the UV light source as appropriate.

While this invention has been described with respect to at least one embodiment, the invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lighting system, comprising:
a lighting device configured to be connected to an object, the lighting device comprising:
a body;
at least one visible light source connected to the body, the at least one visible light source being configured for emitting visible light; and
at least one ultraviolet light source connected to the body, the at least one ultraviolet light source being configured for emitting ultraviolet light, the at least one ultraviolet light source being operably coupled to the at least one visible light source,
wherein the lighting device is configured for strobing the at least one visible light source and the at least one ultraviolet light source by turning the at least one ultraviolet light source on upon the at least one visible light source turning off and turning the at least one ultraviolet light source off upon the at least one visible light source turning on such that a reflectance material of an object, which is not being illuminated by the at least one visible light source, is illuminated by the at least one ultraviolet light source.

2. The lighting system of claim 1, wherein
the lighting device further includes a control device operably connected to the at least one visible light source and the at least one ultraviolet light source, the control device being configured for turning on and turning off the at least one visible light source and the at least one ultraviolet light source.

3. The lighting system of claim 2, wherein
the control device is in the form of a switch.

4. The lighting system of claim 2, wherein
the control device is in the form of a microcontroller.

5. The lighting system of claim 2, wherein
the lighting device further includes at least one light sensor operably connected to the control device, the at least one light sensor being configured for sensing ambient light, wherein the control device is configured for turning the at least one ultraviolet light source on and off responsive to the sensed ambient light.

6. The lighting system of claim 5, wherein
the control device is configured for strobing the at least one visible light source and maintaining the at least one ultraviolet light source in an off state upon the at least one light sensor sensing a sufficient amount of ambient light.

7. The lighting system of claim 5, wherein
the at least one light sensor is in the form of at least one optical sensor.

8. The lighting system of claim 1, wherein
the at least one ultraviolet light source and the at least one visible light source are located on a common substrate.

9. The lighting system of claim 1, wherein
the at least one ultraviolet light source emits ultraviolet light in a wavelength range from 360 nm to 385 nm.

10. The lighting system of claim 8, wherein
the at least one ultraviolet light source emits ultraviolet light at a wavelength of 365 nm.

11. A vehicle, comprising:
a vehicle control unit; and
a lighting system comprising a lighting device operably connected to the vehicle control unit, the lighting device comprising:
a body;
at least one visible light source connected to the body, the at least one visible light source being configured for emitting visible light; and
at least one ultraviolet light source connected to the body, the at least one ultraviolet light source being configured for emitting ultraviolet light, the at least one ultraviolet light source being operably coupled to the at least one visible light source,
wherein the lighting device is configured for strobing the at least one visible light source and the at least one ultraviolet light source by turning the at least one ultraviolet light source on upon the at least one visible light source turning off and turning the at least one ultraviolet light source off upon the at least one visible light source turning on such that a reflectance material of an object, which is not being illuminated by the at least one visible light source, is illuminated by the at least one ultraviolet light source.

12. The vehicle of claim 11, wherein
the lighting device further includes a control device operably connected to the vehicle control unit, the at least one visible light source, and the at least one ultraviolet light source, the control device being configured for turning on and turning off the at least one visible light source and the at least one ultraviolet light source.

13. The vehicle of claim 12, wherein
the control device is in the form of a switch.

14. The vehicle of claim 12, wherein
the control device is in the form of a microcontroller.

15. The vehicle of claim 12, wherein
the lighting device further includes at least one light sensor operably connected to the control device, the at least one light sensor being configured for sensing ambient light, wherein the control device is configured for turning the at least one ultraviolet light source on and off responsive to the sensed ambient light.

16. The vehicle of claim 15, wherein
the control device is configured for strobing the at least one visible light source and maintaining the at least one ultraviolet light source in an off state upon the at least one light sensor sensing a sufficient amount of ambient light.

17. A lighting system, comprising:
a lighting device configured to be connected to an object, the lighting device comprising:
a body; and
at least one ultraviolet light source connected to the body, the at least one ultraviolet light source being configured for emitting ultraviolet light,
wherein the lighting device is configured for cooperating with at least one existing visible light source,
wherein the lighting device is configured for turning on and turning off the at least one ultraviolet light source in cooperation with the at least one existing visible light source, and
wherein the lighting device is a stand-alone lighting device.

18. The lighting system of claim 17, wherein
the lighting device further includes a control device operably connected to the at least one ultraviolet light source, the control device being configured for turning on and turning off the at least one ultraviolet light source.

19. The lighting system of claim 18, wherein
the lighting device further includes at least one light sensor operably connected to the control device, the at least one light sensor being configured for sensing visible light from the at least one existing visible light source.

20. The lighting system of claim 17, wherein
the lighting device is configured for receiving a signal from the at least one existing visible light source, the signal being determinative of whether the at least one existing visible light source is on or off, wherein the lighting device is configured for turning on and turning off the at least one ultraviolet light source in dependence upon the signal.

* * * * *